(12) United States Patent
Ho

(10) Patent No.: US 7,475,766 B2
(45) Date of Patent: Jan. 13, 2009

(54) MULTI-PURPOSE TRANSPORTATION SYSTEM

(75) Inventor: Kwun-Mao Ho, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 0 days.

(21) Appl. No.: 11/758,040

(22) Filed: Jun. 5, 2007

(65) Prior Publication Data

US 2008/0190731 A1    Aug. 14, 2008

(30) Foreign Application Priority Data

Feb. 12, 2007    (TW) .............................. 96104958 A

(51) Int. Cl.
  *B66B 23/00*    (2006.01)
(52) U.S. Cl. ...................... 198/321; 187/201
(58) Field of Classification Search ............... 198/321, 198/322; 187/201; 104/24; 185/42

See application file for complete search history.

(56) References Cited

U.S. PATENT DOCUMENTS

| 1,040,411 | A | * | 10/1912 | Raymond | 104/25 |
| 1,412,254 | A | * | 4/1922 | Meyer | 186/42 |
| 3,757,420 | A | * | 9/1973 | Silverman | 433/33 |
| 3,814,020 | A | * | 6/1974 | Oliver | 104/25 |
| 3,881,574 | A | * | 5/1975 | Grange | 186/57 |
| 5,230,405 | A | * | 7/1993 | Bartelt | 187/201 |
| 5,533,594 | A | * | 7/1996 | Tremblay et al. | 187/201 |
| 7,210,563 | B2 | * | 5/2007 | Vroegindeweij | 187/201 |

* cited by examiner

*Primary Examiner*—James R Bidwell
(74) *Attorney, Agent, or Firm*—WPAT, P.C.; Justin King

(57) ABSTRACT

The present invention provides a multi-purpose transportation system, including: a carrying platform including a gap path; a conveying module located underneath the carrying platform and extending along the gap path; and a carrying device coupled through the gap path onto the conveying module via a conveying base, wherein the carrying device further includes a control unit for controlling the moving direction of the conveying module.

7 Claims, 3 Drawing Sheets

MULTI-PURPOSE TRANSPORTATION SYSTEM

BACKGROUND OF THE INVENTION

1. Field of the Invention

The present invention relates to a factory automation system, and more particularly to a multi-purpose transportation system.

2. Description of the Prior Art

Many personnel working in a factory are required to wear anti-static garment and stand in front of a machine for a long time or move between different machines to manage and operate the machines. In traditional industries, there are also big factories that require personnel to constantly walk around in order to attend or operate his/her machines.

However, staff standing for long durations or walking around constantly may get tired easily, which lowers the work efficiency. Moreover, staff sometimes have to carry raw materials or products with them when moving around, which is even more exhausting.

In view of the shortcomings in the prior art, the present invention discloses a multi-purpose transportation system that can be controlled by the staff themselves, so that the staff can easily move between operating machines at their will. Additionally, the system can assist staff in transporting more raw materials or products. Therefore, operating efficiency of the personnel and the production efficiency of the factory can be improved.

SUMMARY OF THE INVENTION

One objective of the present invention is to provide a multi-purpose transportation system, including: a carrying platform including a gap path; a conveying module located underneath the carrying platform and extending along the gap path; and a carrying device coupled through the gap path onto the conveying module via a conveying base, wherein the carrying device further includes a control unit for controlling the moving direction of the conveying module.

Another objective of the present invention is to provide a multi-purpose transportation system, including: a conveying module; a carrying device, including: a power self-walking base that moves within the layout of the conveying module; and a carrier coupled onto the power self-moving base, wherein the carrying device includes a control unit for controlling the moving direction of carrying device; and a plurality of signal transceivers for providing positioning data of the carrying device and recording data related to movements of the carrying device, wherein the plurality of signal transceivers is disposed corresponding to a plurality of operating machines.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1A:
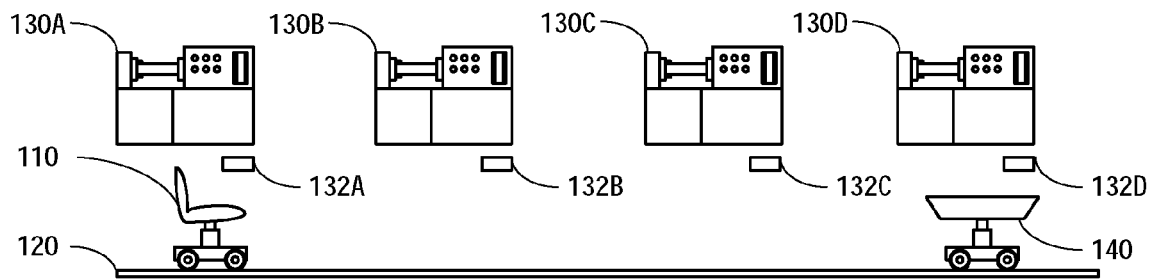
FIG. 1A is a preferred embodiment of the present invention.

The present invention will describe some embodiments as follow. However, apart from the disclosed embodiments, the present invention can also be applied to other embodiments. The scope of the present invention is not limited to these embodiments. Rather, the present invention is only defined by the appended claims. In order to provide a better understanding of the present invention, various parts of the drawing are not drawn to scale; ratios of certain dimensions with respect to others may be exaggerated, while irrelevant details are not shown for simplicity.

Please refer to FIG. 1A, a preferred embodiment of the present invention is shown. A carrying device 110 moves within an area laid out by a conveying module 120. In this embodiment, the conveying module 120 is a rail on which the carrying device 110 moves. A plurality of signal transceivers 132A, 132B, 132C and 132D is disposed on a plurality of operating machines 130A, 130B, 130C and 130D, respectively. When the carrying device 110 moves to a corresponding machine, the signal transceiver provides positioning data of the carrying device 110 and records the number of times the carrying device 110 moves to the machine. In this embodiment, the conveying module 120 is a non-power guiding module and is arranged in a preferred path based on the positions of the operating machines 130A, 130B, 130C and 130D. The carrying device 110 is a power self-moving device, comprising a power self-moving base and a carrier. The carrier can be coupled onto the base via a rotational bearing, and it can be a rotational seat such as a carrying device 110, or a material container such as a carrying device 140.

Additionally, the carrying device 110 further includes a control unit for controlling the carrying device 110. As such, an operator on the carrying device can control the direction of the carrying device 110. In another embodiment, the control unit can also be a wireless remote and a wireless receiver, wherein the wireless receiver is fixed to the carrying device 110. Thereby, an operator can control the direction of the carrying device 110 from a remote place.

Figure 1B:
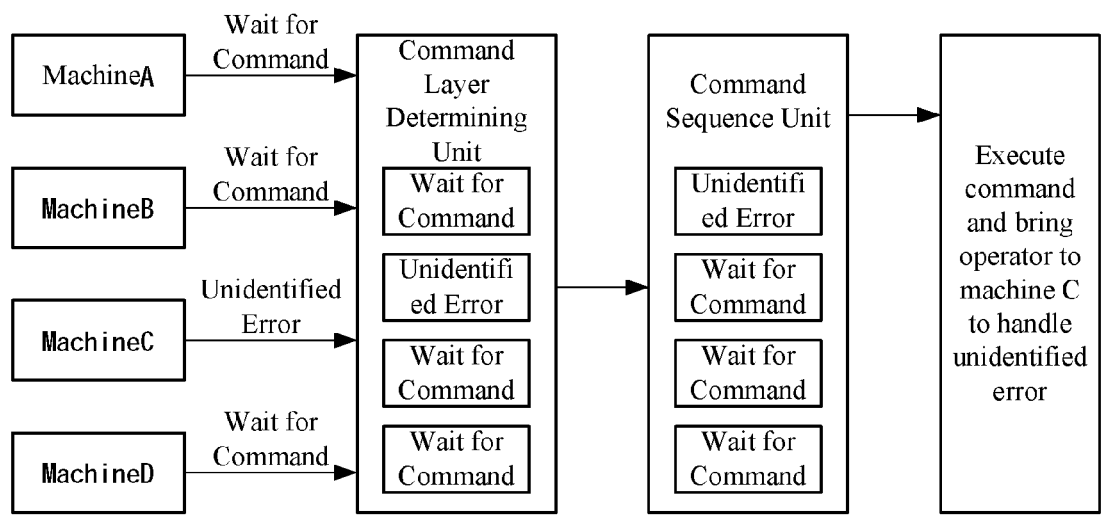
FIG. 1B is a preferred system control flow of the present invention.

Referring to FIG. 1B, a preferred system control flow of the present invention is shown. During normal operation, operating machines A, B, C and D executes an instruction upon receiving it from an operator, after execution, they waits for the next instruction. When any operating machine malfunctions, the control unit of the carrying device 110 stores an error message sent by a corresponding signal transceiver in its command layer determining unit, and prioritizes the error message in a command sequence unit. Accordingly, an operator can diagnose the unidentified error first.

In another embodiment, when an operating machine has completed a task, it can also send a completion signal to the control unit of the carrying device 110, so that the carrying device 110 can bring the operator to the operating machine for subsequent operation. In this way, the operator may operate the machines more efficiently, increasing the yield of the machines and avoiding production delay and human error and laziness. As in the prior art, an buzzer and/or an indicator can be equipped on each operating machine, so that when an operating machine completes an task, a buzz or a specific flash light can be made to attract operators' attention for further operations.

Figure 2A:
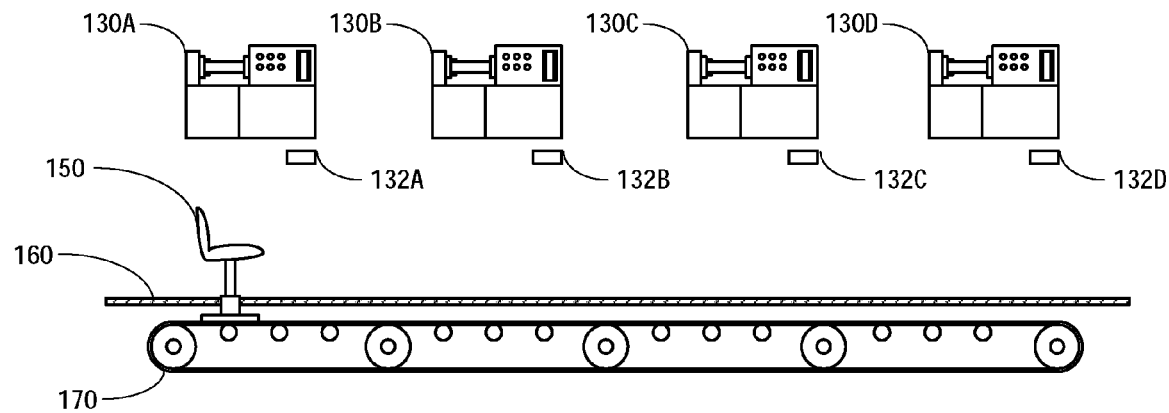
FIG. 2A is another preferred embodiment of the present invention.
Figure 2B:
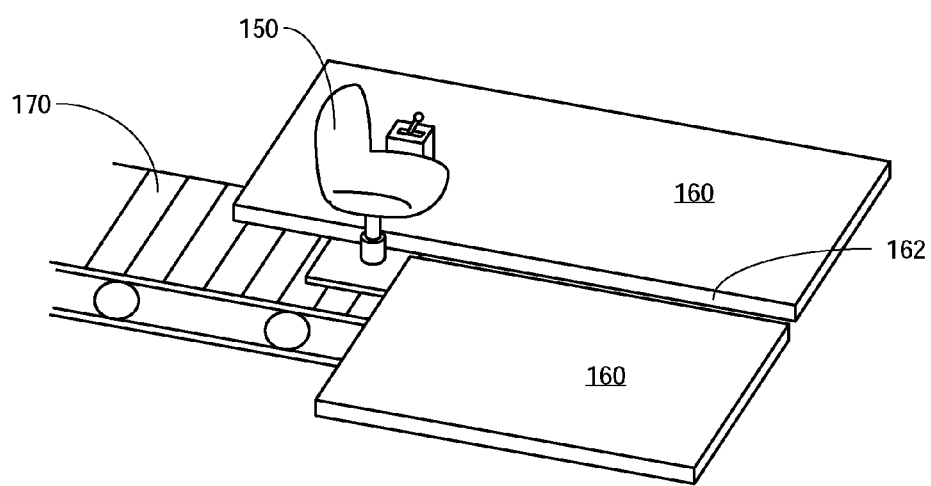
FIG. 2B is a partial perspective view of FIG. 2A.

Referring to FIGS. 2A and 2B, another preferred embodiment of the present invention and its partial perspective view are shown, respectively. A carrying platform 160 includes a gap path 162. In this embodiment, the carrying platform may be the floor plane or a raised floor. A conveying module 170 is located beneath the carrying platform 160 and extends along the gap path 162. In this embodiment, the conveying module 170 is a conveyor belt module.

A carrying device 150 is coupled through the gap path 162 onto the conveying module 170 (conveyor belt module) via a conveying base, wherein the carrying device 150 further includes a control unit for controlling the direction of the conveying module 170, thereby shifting the carrying device 150 to the operating machines 130A, 130B, 130C and 130D for operation. In this embodiment, the carrying device 150 includes a rotational seat coupled to the conveying base via a rotational bearing. In another embodiment, the carrying device 150 includes a material container similarly coupled to the conveying base via a rotational bearing. However, it should be noted that the number of carrying device 150 on the conveying module 170 is not limited to only one, but can be several carrying devices 150 to increase transportation of raw materials or products.

In addition, the carrying device 150 can also includes a wireless remote and a wireless receiver, wherein the wireless receiver is fixed to the carrying device 150. Thereby, an operator can control the transportation direction of the conveying module 170 from a remote place.

A plurality of signal transceivers 132A, 132B, 132C and 132D is disposed on a plurality of operating machines 130A, 130B, 130C and 130D, respectively. When the carrying device 150 moves to a corresponding machine, the signal transceiver provides positioning data of the carrying device 150 and records the number of times the carrying device 150 moves to the machine. Moreover, when an operating machine has completed a task, it can also send a completion signal to the control unit of the carrying device 150, so that the carrying device 150 can bring the operator to the operating machine for subsequent operation. In this way, the operator may operate the machines more efficiently, increasing the yield of the machines and avoiding production delay and human error and laziness.

Figure 3:
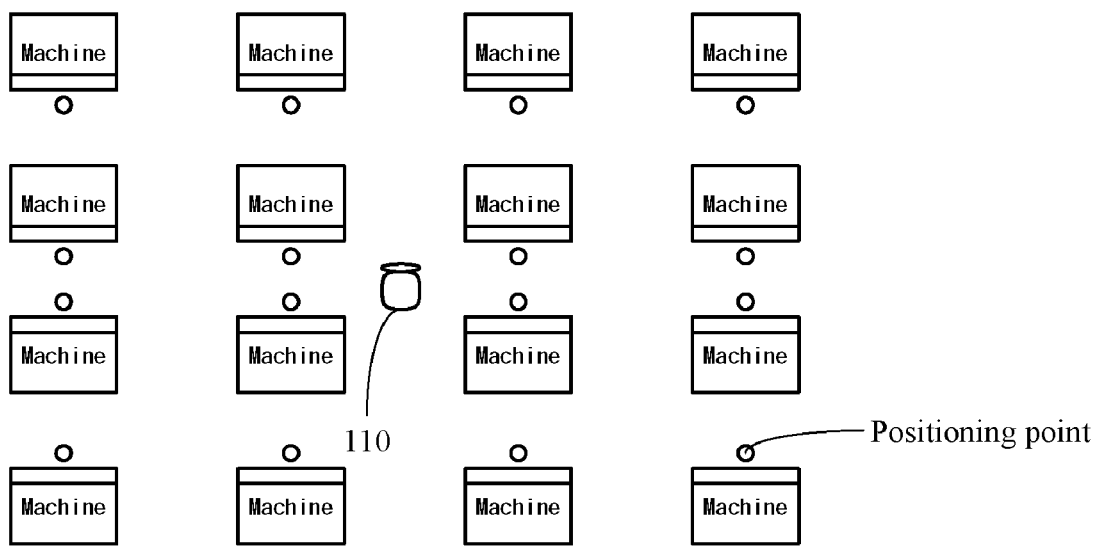
FIG. 3 is still another preferred embodiment of the present invention.
Figure 4:
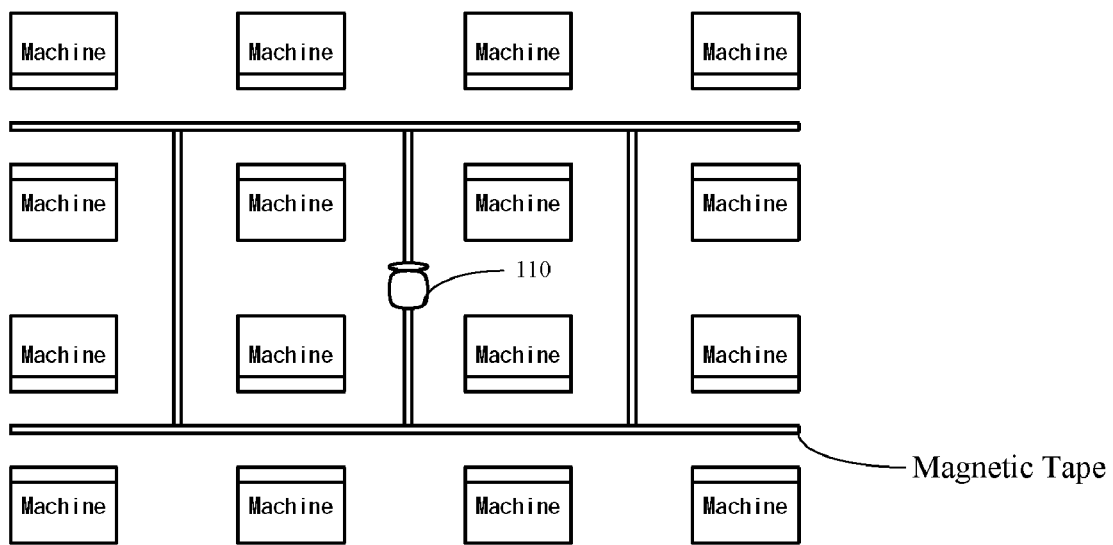
FIG. 4 is yet another preferred embodiment of the present invention.

Referring to FIGS. 3 and 4, still another embodiment and yet another embodiment of the present invention area shown, respectively. They are modifications of the embodiment shown in FIG. 1. In FIG. 3, the conveying module 120 (rail) of FIG. 1A is replaced by a plurality of positioning points, which in conjunction with a positioning module and predefined courses in the carrying device 110 may bring the operator to a destined operating machine. This eliminates the complicated layout of the conveying module 120 (rail). In FIG. 4, the conveying module 120 can be a track made of magnetic material (e.g. a magnetic tape), or a track made of light-reflective material (e.g. a light-reflective tape), which in conjunction with a magnetic guiding device or light-guiding device in the carrying device 110, may bring the operator to a destined operating machine. This reduces the layout cost of the conveying module 120.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breadth to which they are fairly and legally entitled.

The invention claimed is:

1. A multi-purpose transportation system, including:
a conveying module;
a carrying device, including:
a power self-walking base that moves within the layout of the conveying module; and
a carrier coupled onto the power self-moving base, wherein the carrying device includes a control unit for controlling the moving direction of carrying device; and
a plurality of signal transceivers for providing positioning data of the carrying device and recording data related to movements of the carrying device, wherein the plurality of signal transceivers is disposed corresponding to a plurality of operating machines.

2. A multi-purpose transportation system of claim 1, wherein the carrying module includes a rail.

3. A multi-purpose transportation system of claim 2, wherein the rail includes a magnetic material.

4. A multi-purpose transportation system of claim 2, wherein the rail includes a light-reflective material.

5. A multi-purpose transportation system of claim 1, wherein the carrier includes a rotational seat, a coupling between the rotational seat and the power self-moving base including a rotational bearing.

6. A multi-purpose transportation system of claim 1, wherein the carrier includes a material container, a coupling between the material container and the power self-moving base including a rotational bearing.

7. A multi-purpose transportation system of claim 1, wherein the control unit includes a wireless remote and a wireless receiver.

* * * * *